United States Patent [19]
Yamagishi

[11] Patent Number: 5,870,604
[45] Date of Patent: *Feb. 9, 1999

[54] JOB EXECUTION PROCESSOR CHANGING METHOD AND SYSTEM, FOR LOAD DISTRIBUTION AMONG PROCESSORS

[75] Inventor: Tadashi Yamagishi, Yokohama, Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 500,205

[22] Filed: Jul. 10, 1995

[30] Foreign Application Priority Data

Jul. 14, 1994 [JP] Japan ................................. 6-161827

[51] Int. Cl.$^6$ ........................................ G06F 9/00
[52] U.S. Cl. ........................................ 395/675; 395/676
[58] Field of Search ................... 395/650, 700, 395/675, 672, 670; 364/200

[56] References Cited

U.S. PATENT DOCUMENTS

| | | | |
|---|---|---|---|
| 4,748,558 | 5/1988 | Hirosawa | 364/200 |
| 4,839,798 | 6/1989 | Eguchi et al. | 395/200 |
| 5,283,897 | 2/1994 | Georgiadis | 395/650 |
| 5,410,651 | 4/1995 | Sekezawa et al. | 395/200.54 |

FOREIGN PATENT DOCUMENTS 4-335442  11/1992  Japan .

OTHER PUBLICATIONS

Dynamic Load Balancing in a Distributed System Using a Sender–Initiated Algorithms, Anna Haé et al., IEEE 1988.

*Primary Examiner*—Majid A. Banankhah
*Attorney, Agent, or Firm*—Fay, Sharpe, Beall, Fagan, Minnich & McKee

[57] ABSTRACT

In a system including a plurality of processors for executing jobs, an execution processor of which the number of jobs waiting for execution is large is changed to a low-loaded processor so that distribution of the load among the processors is achieved. When jobs are inputted to a processor, a job scheduler stores job information in a job status table and sequentially executed the jobs. Processor monitor control units mutually communicate the load status of the processors by using the communication control unit, and store the status in the operation status table. A job execution processor change control unit changes the jobs waiting for execution in the job status table to the low-loaded processor in the operation status table. The job transfer control unit transfers the jobs to the job execution processor.

26 Claims, 8 Drawing Sheets

FIG. 2

JOB STATUS TABLE

| JOB NAME | EXECUTION PROCESSOR | JOB OPERATION STATUS | EXECUTABLE PROCESSOR |
|---|---|---|---|
| A B C D E F | P1 | UNDER EXECUTION | P1, P2, P3 |
| X Y Z 0 0 0 | P1 | UNDER EXECUTION | P1 |
| A B C 0 0 0 | P1 | WAITING FOR EXECUTION | P1, P2 |
| A 1 2 3 4 5 | P1 | WAITING FOR EXECUTION | P1, P2, P3 |
| X Y Z 1 2 3 | P1 | WAITING FOR EXECUTION | P1, P2 |
| | | | |

FIG. 3

OPERATION STATUS TABLE

| PROCESSOR NAME | NUMBER OF JOBS WAITING FOR EXECUTION | CPU USING RATE | I/O UNIT USING RATE | MEMORY USING RATE |
|---|---|---|---|---|
| P1 | 15 | 80 | 30 | 50 |
| P2 | -1 | 50 | 20 | 80 |
| P3 | 4 | 40 | 60 | 20 |
| P4 | -2 | 60 | 20 | 40 |
| | | | | |

FIG. 7 JOB EXECUTION PROCESSOR CHANGE CONTROL UNIT

JOB EXECUTION PROCESSOR CHANGING METHOD AND SYSTEM, FOR LOAD DISTRIBUTION AMONG PROCESSORS

BACKGROUND OF THE INVENTION

The present invention relates to a method for determining an execution processor in job execution using a computer system, and relates more particularly to a method and a system for changing a job execution processor, suitable for the case where the computer system is structured by a plurality of processors.

According to a conventional method, a job control unit controls a class changing unit by changing the class of a job which is waiting for its execution to the class of the lowest load, under a multiple programming in one processor, as described in, for example, JP-A-4-335442, to thereby achieve the distribution of the load of the system.

In the above-described prior-art technique, no consideration has been given to the case where a host computer is structured by a plurality of processors, and therefore, there has been a problem that since only one execution processor is being used processing is concentrated in this specific processor because it is not possible to change the execution processor even if a job class has been changed.

Further, in the case of a method for changing an execution processor by considering the load of processors when a job has been inputted where a plurality of processors are being used, there has been a problem that the load balance between the processors is broken during a period while the job is waiting for its execution.

SUMMARY OF THE INVENTION

It is an object of the present invention to provide a method and an apparatus for changing a job execution processor which can distribute the load among a plurality of processors without involving an operator or other manual work and without a need for providing a special job scheduler, by providing a processor monitor control unit for mutually monitoring a status of the load among the processors and by providing an execution processor change control unit for changing an execution processor by considering the load of each processor during a period while the execution of the job is being awaited.

In a system which is structured by a plurality of processors for executing jobs, a job scheduler, started by an operating system, for controlling a sequence of job execution, a communication control unit for carrying out data transfer between the processors, and a job transfer control unit, started by an operating system, for carrying out a transfer of jobs between the processors, the above-described object is achieved by further providing the above system with a processor monitor control unit, started by an operating system, for mutually monitoring among the processors, the load status of the number of jobs waiting for their execution for each processor, a CPU using rate, an I/O unit using rate and a memory using rate in an operation status table; a job execution processor change control unit, started by an operating system, for transmitting a request for changing a first execution processor of a job to a high-loaded second processor in the operation status table when there has been no job to be executed by a job scheduler of the first processor among the processors; and a job execution processor change control unit, started by an operating system, for changing the execution of a job from a second processor to a first processor when the second processor has received a request for changing the job execution processor from the first processor.

Further, the above-described object is achieved by providing a job execution processor change control unit, started by an operating system, for changing the execution of a job from a first processor to a low-loaded second processor in the operation status table when the first processor is higher-loaded among other processors in the operation status table.

The processor monitor control unit started by an operating system of each processor checks the load status including the number of jobs waiting for their execution by the processor, a CPU using rate, an I/O unit using rate and a memory using rate during each unit time in the operation status table, and when there has been a change in the operation status of its processor, posts this operation status to other processors, i.e., updates the operation status table of the own processor.

The job execution processor change control unit, started by an operating system of a first processor, checks in the operation status table the operation status of other processors obtained by the processor monitor control unit, started by an operating system, when there has been no job to be executed by the job scheduler operated by the operating system of the first processor, and transmits a request for changing the job execution processor to a high-loaded second processor. The job execution processor change control unit, started by the operating system of the second processor, which has received the request for changing the job execution processor, changes the job execution processor, and the job transfer control unit, started by an operating system, automatically transfers the job to the first processor.

Further, when the job execution processor change control unit, started by an operating system of a high-loaded first processor, changes the execution processor of a job waiting for its execution by the first processor to a low-loaded second processor, the job transfer control unit, started by an operating system, automatically transfers the corresponding job to the second processor.

With the above-described arrangement, a processor suitable for executing a job can be automatically selected. Further, distribution of load of processors can bring with a computer system an effective utilization of the processors.

BRIEF DESCRIPTION OF THE DRAWINGS

FIG. 2 is a diagram for showing an example of the data structure of a job status table 6, FIG. 3 is a diagram for showing an example of the data structure of a job status table 9.

DESCRIPTION OF THE PREFERRED EMBODIMENT

A detailed explanation of one embodiment of the present invention will be made below with reference to the drawings.

Figure 1:
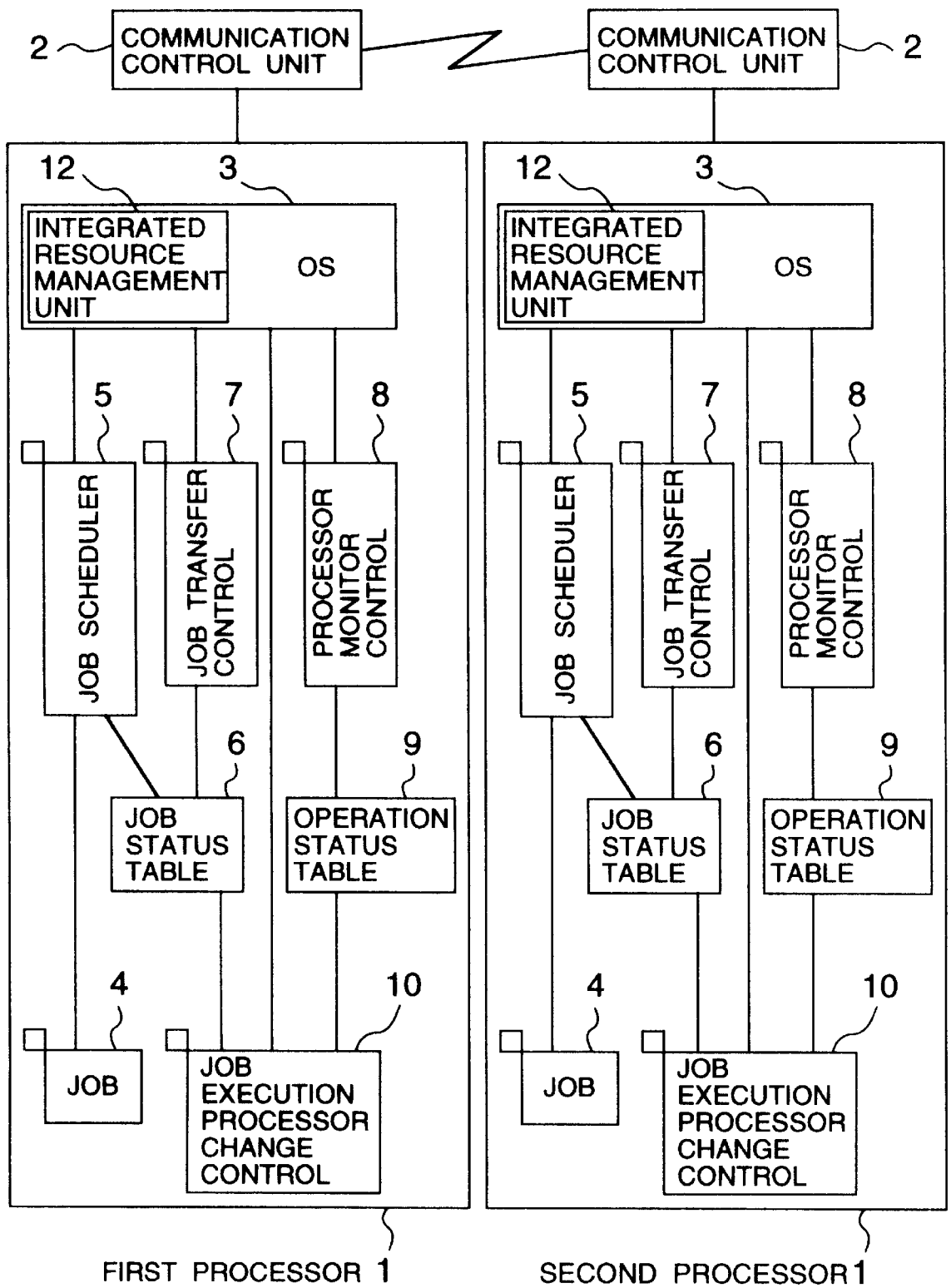
FIG. 1 is a diagram for showing an example of the structure of the job execution processor changing system according to the present invention.

FIG. 1 is a diagram for showing an example of the structure of a system to which a method of changing the job execution processor according to one embodiment of the present invention is applied.

The system shown in FIG. 1 includes a plurality of processors 1 for executing jobs and communication control units 2 for carrying out data transfers between the processors. Each processor 1 and each communication control unit 2 are connected together through input/output channels. The communication control units 2 for connecting the processors are mutually connected by communication lines.

In the processor 1 shown in FIG. 1, there are an operating system (OS) 3 for controlling the operation of the processor 1, a job 4 for carrying out data processing in the OS 3, a job scheduler 5 for controlling the execution sequence of the job 4, a job status table 6 for storing job execution control information to be used for the job scheduler 5 to control the sequential execution of jobs by the number of job execution multiplicity assigned by the processor, a job transfer control unit 7 for transferring a job to another processor when the job execution processor information in the job status table 6 is for the other processor, a processor monitor control unit 8 for checking the operation status of the processor and mutually transferring the operation status between the processors, an operation status table 9 for storing the operation status of the processor obtained by the processor monitor control unit 8, and a job execution processor change control unit 10 for changing a job execution processor based on the operating status of the processor.

FIGS. 2 and 3 show examples of data structures of the job execution processor changing method according to the present invention.

FIG. 2 is a diagram for showing an example of the data structure in the job status table 6 shown in FIG. 1.

The job status table 6 includes a job name 61 for identifying each job, a job execution processor 62 determined at the time each job is inputted, a job operation status 63 for showing whether each job is under execution or the job is waiting to be executed, and a job executable processor assigned by a job control statement.

FIG. 3 is a diagram for showing an example of the data structure of the operation status table 9 prepared in the processor 1 shown in FIG. 1. The operation status table 9 includes a processor name 91 for identifying a processor, the number of jobs waiting for execution 92 for showing the load of each processor, a CPU using rate 93, an I/O unit using rate 94 and a memory using rate 95. When the value of the number of jobs waiting for execution 92 is "1" or above, the number of jobs awaiting execution is shown. When the value is "0", this shows that there is no job waiting for its execution and that the same number of jobs as the job multiplicity assigned to the processor is under execution. When the value is "−1" or less, this shows the number of jobs which are short of execution against the job multiplicity assigned to the processor. Each of the CPU using rate 93, the I/O unit using rate 94 and the memory using rate 95 shows each using rate during a unit time in percentage.

The number of jobs waiting for execution 92 is managed by the job scheduler 5, started by the operating system, for controlling the execution of jobs that have been inputted. The processor monitor control unit 8, started by the operating system, queries the job scheduler 5 through the operating system and obtains the number of jobs waiting for execution.

The CPU using rate 93, the I/O unit using rate 94 and the memory using rate 95 are calculated by the integrated resource management unit 12 of the operating system by measuring use or non-use of the respective units during each unit time. The processor monitor control unit 8, started by the operating system, inquires the resource integrated monitoring unit 12 of the system and obtains these using rates.

Figure 9:
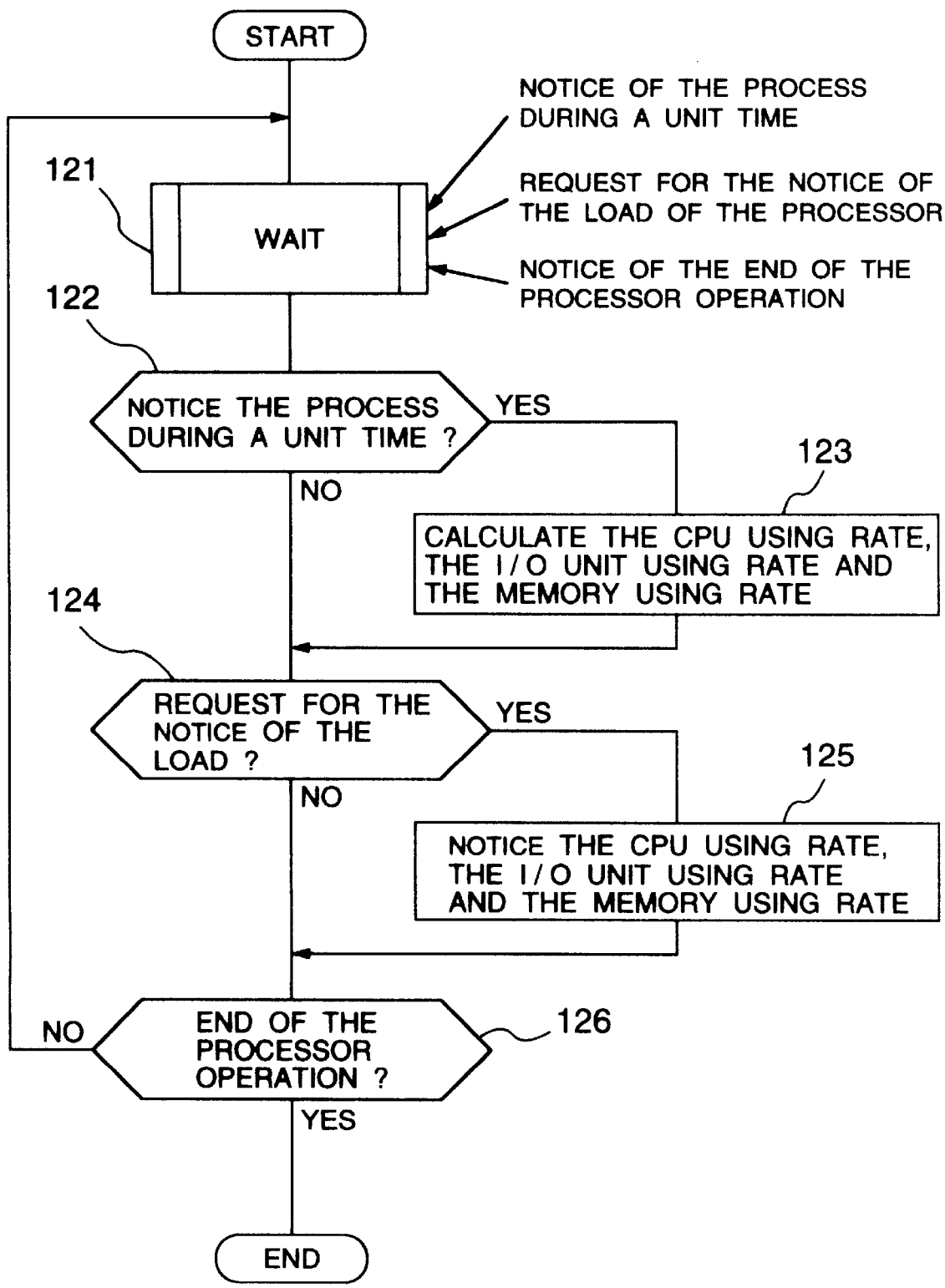
FIG. 9 is a flow chart for showing an example of the structure of an integrated resource management unit 12.

FIG. 9 shows an example of the operation procedure of the integrated resource management unit 12 prepared in the OS 3 of the processor 1 shown in FIG. 1.

The integrated resource management system 12 is started by the OS 3 at the time the processor 1 is started, and waits for a request from the OS 3 (121). When a request from the OS 3 indicates the elapse of a unit time (122), the integrated resource management system 12 calculates the CPU using rate 93, the I/O unit using rate 94 and the memory using rate 95 (123). The CPU using rate 93 is an average value obtained within a measuring time given in advance to the integrated resource management system 12 based on the assumption that the rate is 100% when there is another control unit which requires the CPU and 0% when there is no such other control unit. The I/O unit using rate 94 is an average value obtained within a measuring time based on the assumption that the value is 100% when the processor 1 is executing I/O and 0% when the processor is not executing I/O. The memory using rate 95 is an average value of the using rate of the memory obtained within a measuring time. In response to a request, from the OS 3, for sending the load of the processor (124), the integrated resource management system 12 sends the CPU using rate 93, the I/O unit using rate 94 and the memory using rate 95 (123). When receiving an end of operation of the processor 1 (126), the operation is terminated. When the processor 1 is to continue the operation, the process goes back to the Step (121).

FIGS. 4 to 7 are flow charts for showing examples of the operation procedures of the system for changing a job execution processor.

Figure 4:
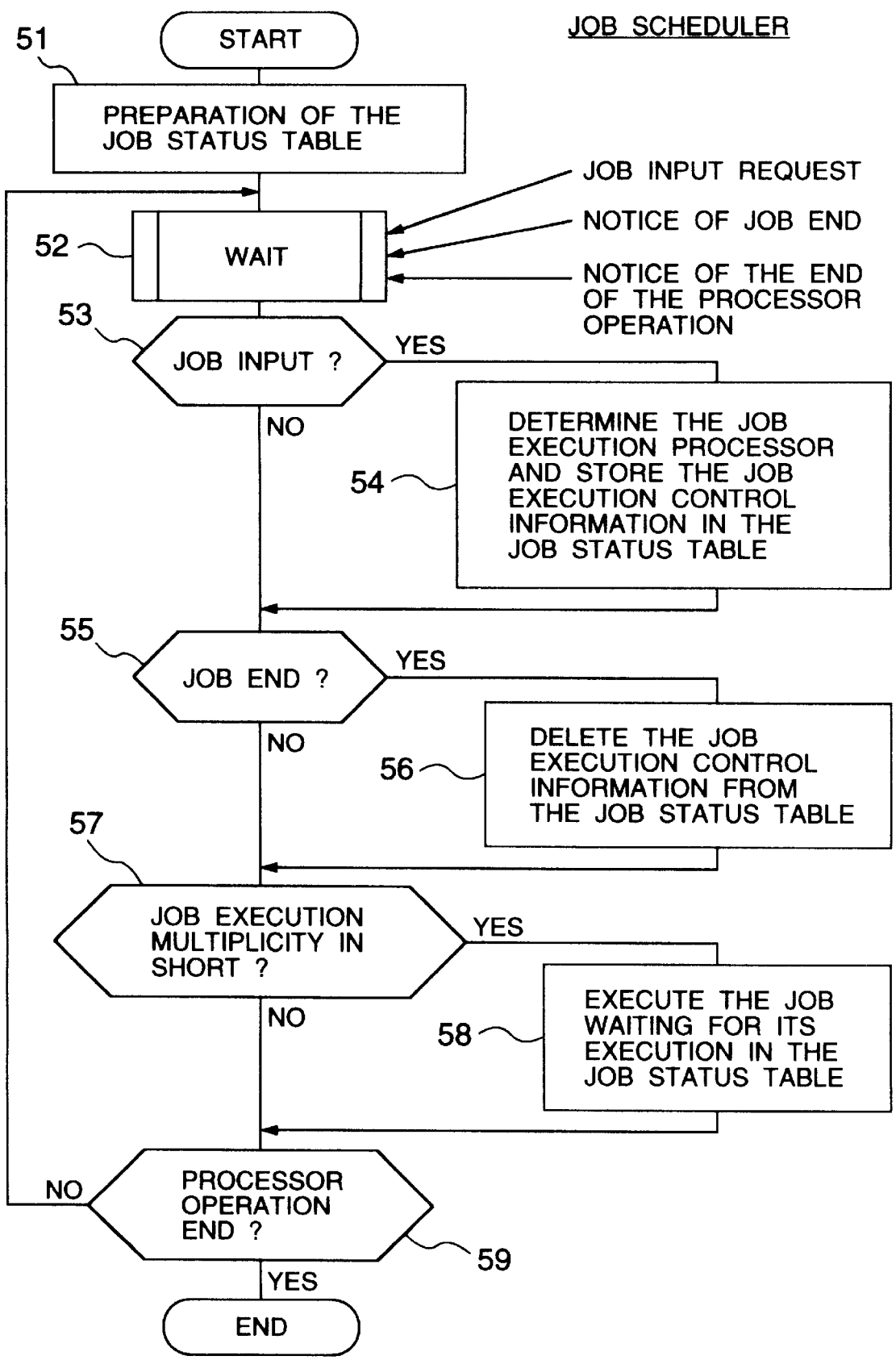
FIG. 4 is a flow chart for showing an example of the structure of a job scheduler 5.

FIG. 4 shows an example of the operation procedure of the job scheduler 5 prepared in the processor 1 shown in FIG. 1.

The job scheduler 5 is started by the OS 3 at the time the processor 1 is started, and prepares the job status table 6 (51) and waits for a request from the OS 3 (52). When a request from the OS 3 is one for inputting a job (53), the job scheduler 5 interprets a job control statement and selects a processor of a smaller load (the number of jobs waiting for execution, the CPU using rate, the I/O using rate and the memory using rate) as a job execution processor which can execute the job, and sequentially stores the job, execution control information (the job name 61, the execution processor 62, the job operation status 63 and the executable processor 64) from the top address of the job status table 6 (54). When a request from the OS 3 is for terminating a job (55), the job scheduler 5 deletes the job execution control information of the terminated job from the job status table 6 (56). By the above-described processing, the number of jobs currently under execution is checked on the basis of the execution processor 62 and the job operation status 63 of the job status table 6. If the number of jobs is smaller than the job execution multiplicity assigned by the processor (57), jobs which include the executable processors 64 are selected by the jobs waiting for execution in the job operation status 63 and the selected jobs are executed sequentially from the top of the job status table 6 (58). In response to a notice of an end of the operation of the processor 1 (59), the operation is terminated. When the processor 1 is to continue the operation, the process goes back to the Step (52).

Figure 5:
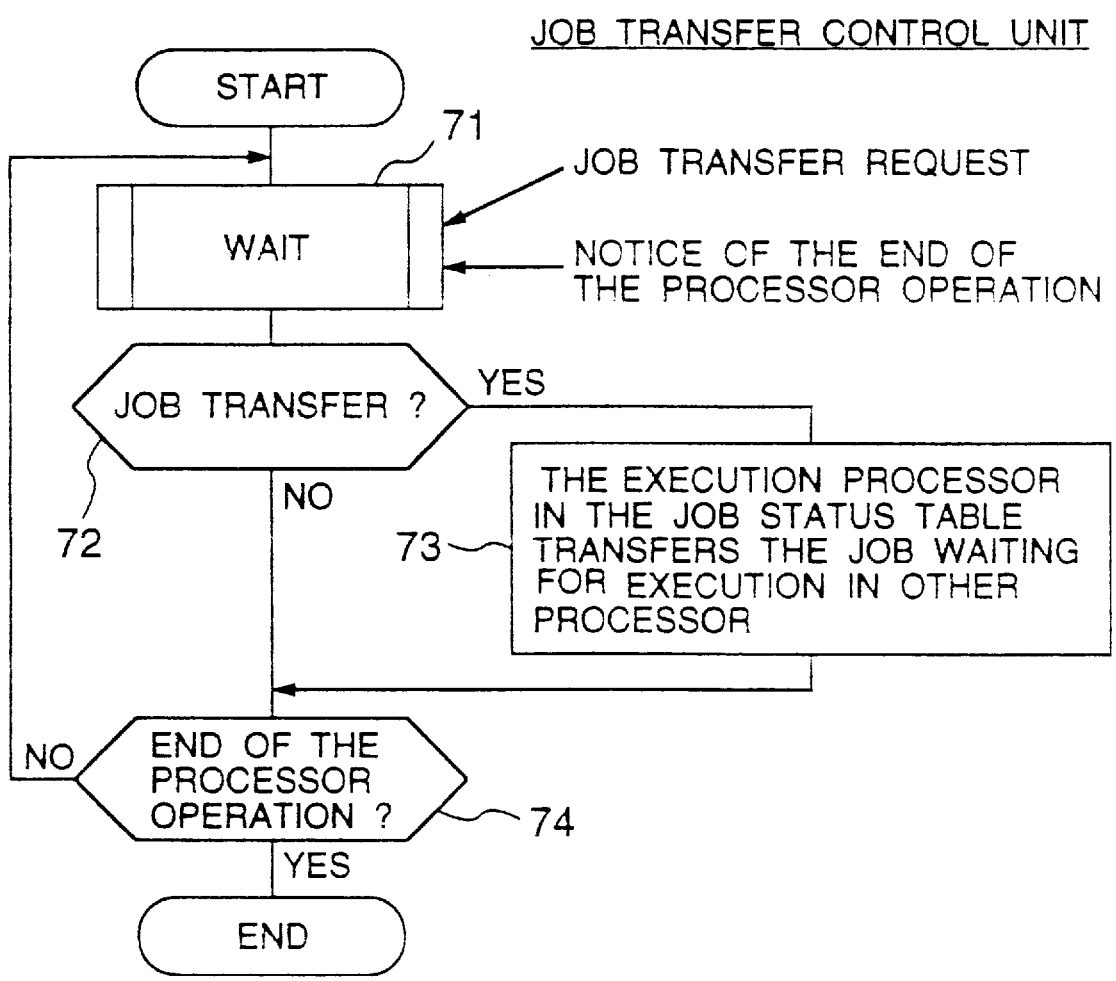
FIG. 5 is a flow chart for showing an example of the structure of a job transfer control unit 7.

Next, FIG. 5 shows an example of the operation procedure of the job transfer control unit 7 prepared in FIG. 1.

The job transfer control unit 7 is started by the OS 3 at the time when the processor 1 is started, and waits for a request from the OS 3 (71). When a request from the OS 3 is for the transfer of a job to another processor (72), the job transfer control unit 7 refers to the job status table 6 and transfers a job which corresponds to the job waiting for execution in the job operating status 63 and which corresponds to the other processor in the execution processor 62. When receiving a notice of an end of the operation of the processor 1 (74), the operation is terminated. When the processor 1 is to continue operation, the process goes back to Step (71).

Figure 6:
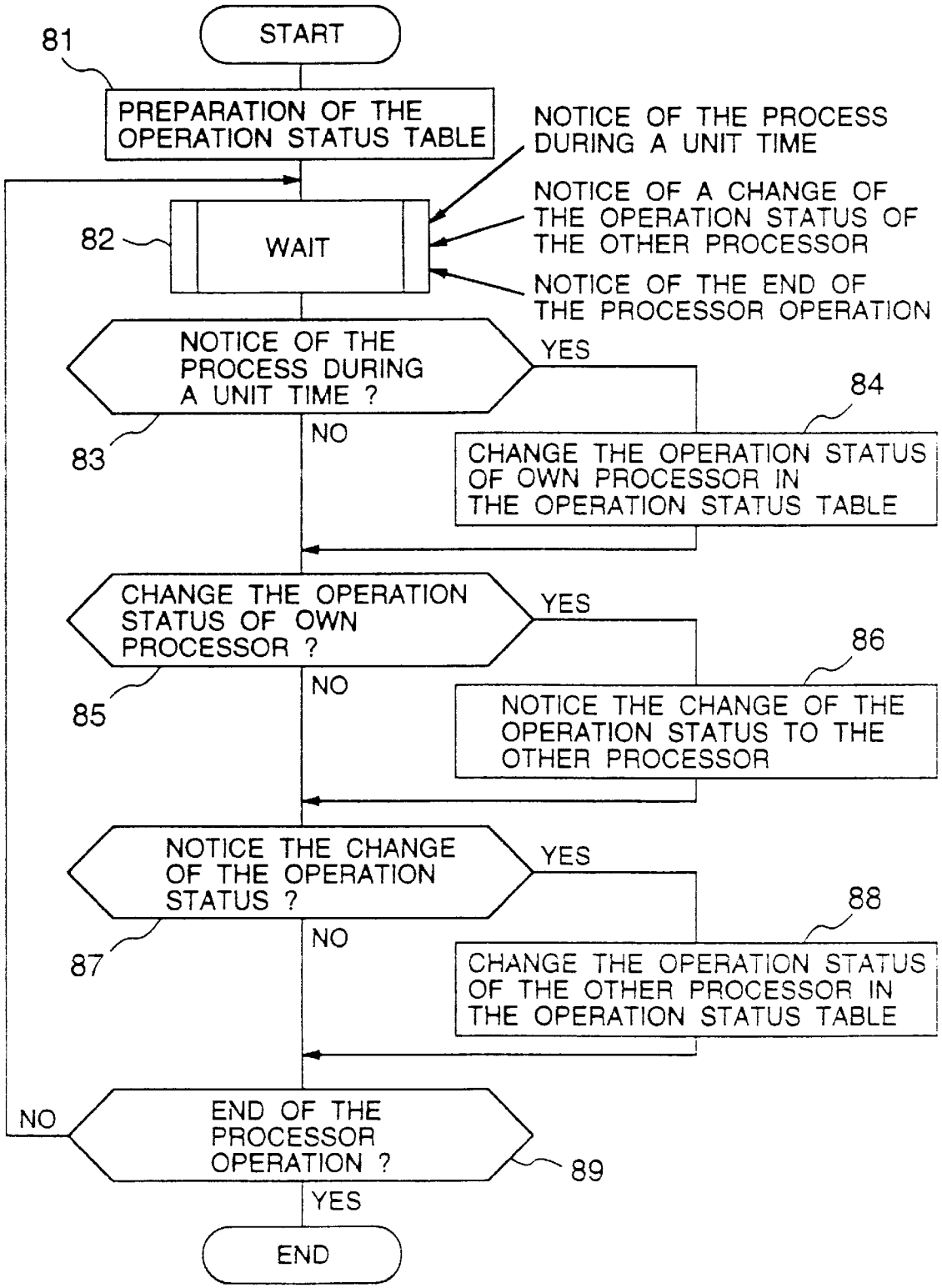
FIG. 6 is a flow chart for showing an example of the structure of a processor monitor control unit 8.

FIG. 6 shows an example of the operation procedure of the processor monitor control unit 8 prepared in the processor 1 in FIG. 1.

The processor monitor control unit 8 is started by the OS 3 at the time when the processor 1 is started, and prepares the operation status table 9 (81) and waits for a request from the OS 3 (82). When a request from the OS 3 is indicating the elapse of a unit time (83), the processor monitor control unit 8 obtains from the integrated resource management unit 11 the number of jobs waiting for their execution by the processor, the CPU using rate, the I/O using rate and the memory using rate, and changes the operation status of its own processor, that is, the number of jobs waiting for execution 92, the CPU using rate 93, the I/O unit using rate 94 and the memory using rate 95 in the operation status table 9 (84). When the operation status table 9 has been changed by the above processing (85), the processor monitor control unit 8 notices the change of the operation status of its own processor to another processor (86). When a request from the OS 3 is one for noticing a change of the operation status of the other processor (87), the processor monitor control unit 8 changes the operation status of the other processor, that is, the number of jobs waiting for execution 92, the CPU using rate 93, the I/O unit using rate 94 and the memory using rate 95 in the operation status table 9 (88). When receiving a notice of an end of operation of the processor 1 (89), the operation is terminated. When the processor 1 is to continue the operation, the process goes back to Step (82).

Figure 7:
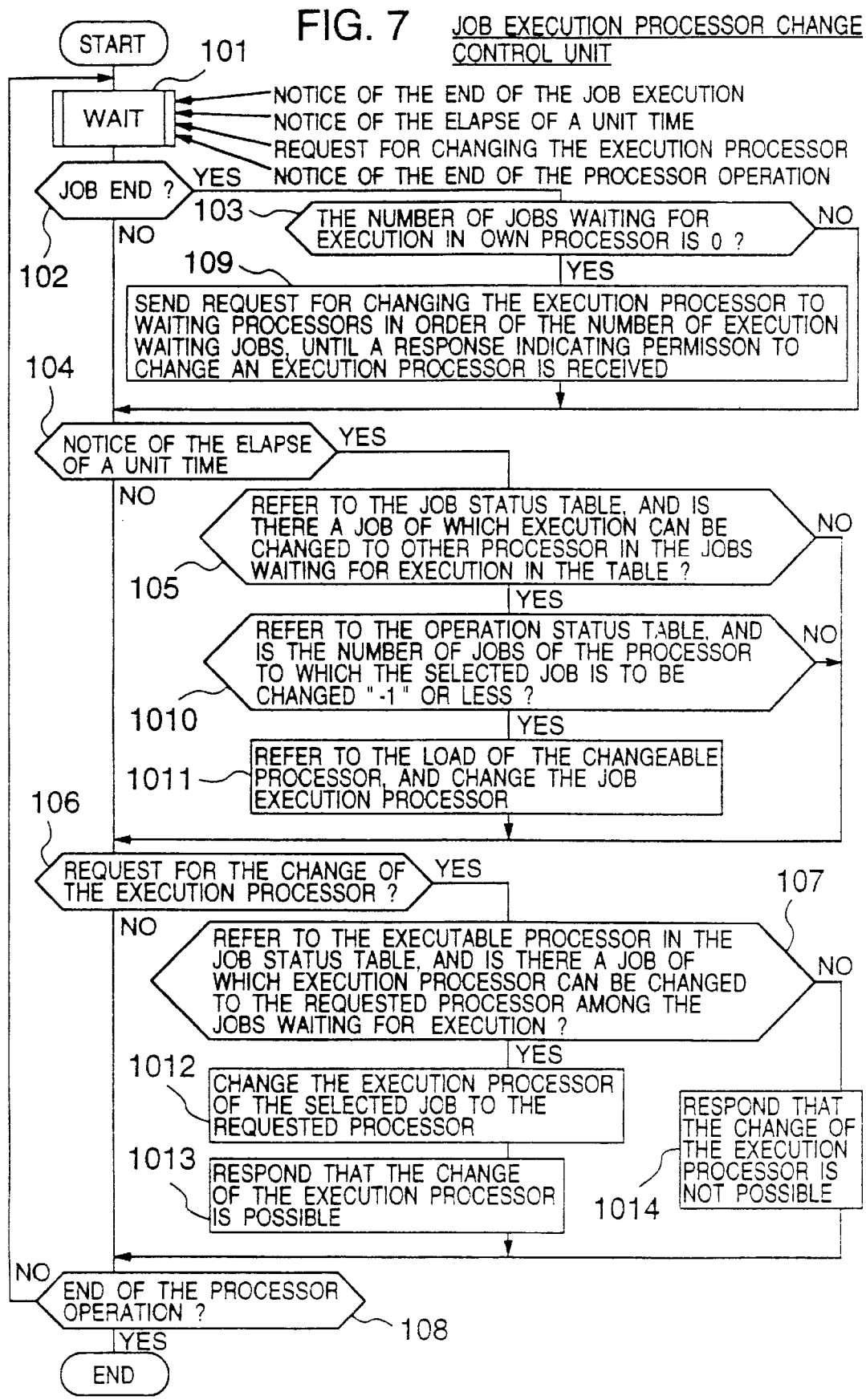
FIG. 7 is a flow chart for showing an example of the structure of a job execution processor change control unit 10.

FIG. 7 shows an example of the operation procedure of the job execution processor change control unit 10 prepared in the processor 1 in FIG. 1.

The execution processor change control unit 10 is started by the OS 3 at the time when the processor 1 is started, and waits for a request from the OS 3 (101). When a request from the OS 3 is for noticing an end of a job (102), the execution processor change control unit 10 refers to the operation status table 9 and, when the number of jobs waiting for execution by its own processor is 0 (103), requests the execution processor change control unit 10 of another processor of which the number of jobs waiting for execution is the larger among other processors, for a change of the jobs waiting for execution by the other processor to its own processor for execution thereby (108). When there has been a response that it is not possible to change the execution processor for the waiting jobs, the execution processor change control unit 10 of the first processor sequentially makes a request for a change of the execution processor to other processors of which the number of jobs waiting for execution is larger. By comparing the number of jobs waiting for execution 92 for each processor with the numbers of other processors in the operation status table 9, it is possible to know the relative numbers of jobs waiting for execution among all the processors. When a request from the OS 3 indicates the elapse of a unit time (104), the execution processor change control unit 10 refers to the job status table 6 from the top of this table and selects a job which is executable by the other processor in the executable processor 64 among jobs of which execution is being awaited in the job operation status 62 (105). Further, by referring to the operation status table 9, the execution processor change control unit 10 changes the area of the execution processor 62 to the name of the processor of which the number of jobs waiting for execution 92 is "−1" or less for the other executable processor 91 (the processor of which job execution is short relative to the job multiplicity assigned to the processor), and posts the result to the job transfer control unit 7 (105, 1010).

When there is a plurality of names of changeable processors, the execution processor change control unit 10 selects a processor of which the load (the CPU using rate 93, the I/O unit using rate 94 and the memory using rate 95) is low, and changes the name of the job execution processor (1011). When a request from the OS 3 is for changing the job execution processor from the other processor (106), the execution processor change control unit 10 refers to the job status table 6 from the top of the table and selects one job which includes the name of the processor that is the sender of the request for the change in the executable processor 64, among the jobs of which execution is being awaited in the job operation status 63 (107), and changes the name of the job execution processor 62 to the name of the processor which is the change request sender (1012). The execution processor change control unit 10 sends the changed result to the job transfer control unit 7 and returns the response that it is possible to change the job execution processor to the change requesting processor (1013). When receiving a notice that an end of operation of the processor 1 has been received (108), the operation is terminated. When the processor 1 is to continue the operation, the process goes back to the processing in (101).

Figure 8:
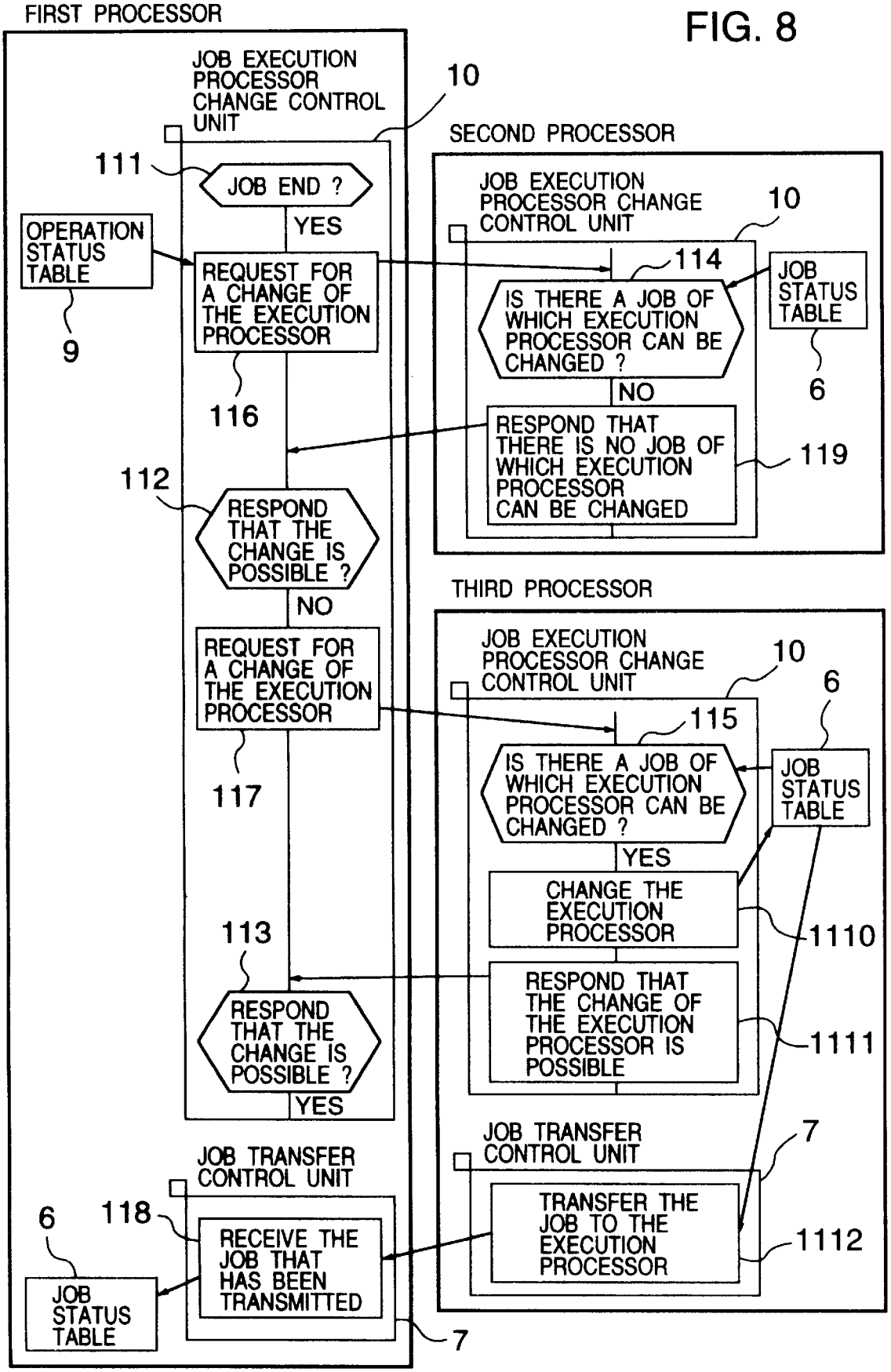
FIG. 8 is a diagram for supplementally explaining a change to a job execution processor.

Next, by referring to FIG. 8, description will be made of the case where there is no job to be executed by a first processor and a job execution processor is changed from the other processor to the first processor.

The job execution processor change control unit 10 started by the operating system of the first processor makes a decision whether a job has been completed by its own processor or not (111). If the job has been completed, the job execution processor change control unit 10 refers to the operation status table 9, and when the number of jobs waiting for execution by its the own processor is 0, requests a second processor of which the number of jobs waiting for execution is large, a change of the jobs waiting for execution in the job operation status 63 in the job status table 6 to the first processor for the execution of these jobs by the first processor (116).

The job execution processor change control unit 10 of the second processor refers to the job status table 6 from the top of the table and searches the job name 61 which includes the name of the first processor in the executable processor 64, among the jobs that are waiting for execution in the job operation status 63 (114). When there is no corresponding job, the job execution processor change control unit 10 of the second processor returns a response to the first processor that it is not possible to change the job executable processor (119).

The first processor then requests a third processor of which the number of jobs waiting for their execution 92 is large, a change of jobs waiting for their execution in the job operation status 63 to the first processor for execution by the first processor (117).

The job execution processor change control unit 10 of the third processor refers to the job status table 6 from the header of the table and searches the job name 61 which includes the name of the first processor in the executable processor 64, among the jobs that are waiting for execution in the job operation status 63 (114). When there is a job that includes the name of the first processor in the executable processor 62 (115), the job execution processor change control unit 10 of the third processor changes the name of the executable processor 62 in the job name 61 to the name of the first processor, and posts the changed result to the job transfer control unit 7 and returns a response to the first processor that it is possible to change the executable processor for this job (1111).

The job transfer control unit 7 started by the operating system of the third processor refers to the job status table 6 and transfers to the first processor the job of which execution processor is the first processor (1112).

The first processor receives the job that has been transferred from the job transfer control unit 7 of the third processor to the job transfer control unit 7 of the first processor (118).

The first processor executes the corresponding job.

Further, the job execution processor change control unit 10 refers to the job status table 6 during each unit time, and when there is a job of which execution is being awaited in the job operation status 63 that can also be executed by another processor in the executable processor 64, and when there is a processor of −1 or less in the number of jobs waiting for their execution 92 in the operation status table 9, the job execution processor change control unit 10 changes the corresponding processor to this other processor in the execution processor 62 in the job status table 6.

The other processor mentioned above refers to the processor of which the number of jobs waiting for execution 92 in the operation status table 9 is −1 or less, of which the load (the CPU using rate 93, the I/O unit using rate 94 and the memory using rate 95) is low, and which is included in the executable processor 64.

The job transfer control unit 7 started by the operating system of the processor refers to the job status table 6, and transfers the job of which execution is by another processor in the execution processor 62 to the corresponding other processor.

The job transfer control unit 7 of the other processor receives the job that has been transferred to this processor.

With the above-described processing, it is possible to automatically change a processor for executing a job so that the operating status of each processor becomes optimum, without involving the consciousness of the job execution requester about the job execution processor.

As explained above, according to the present invention, among a plurality of processors, an execution processor of a job waiting for execution is automatically changed to another processor in accordance with the operation status of the processors, so that the center manager can make an effective utilization of the processors.

Further, since a job execution processor is automatically changed to another processor so that the operation status of each processor becomes optimum, a user can select a processor which is suitable for executing a job.

What is claimed is:

1. In a system including a plurality of processors for executing jobs, a job scheduler for controlling the sequence of executing said jobs, a communication control unit for carrying out data transmission between said plurality of processors, and job transfer means for carrying out transfer of jobs between said plurality of processors, a method for changing a job execution processor, including the steps of:

a processor monitoring step for mutually monitoring a load status of each of said plurality of processors;

a job execution processor determining step for determining a job execution processor by comparing the load statuses of all of said plurality of processors when a job is inputted to the system, wherein said step of comparing the load statuses of all of said plurality of processors is performed by referring to an operation status table that stores the load statuses of all of said plurality of processors; and a job execution processor changing step for mutually changing a job execution processor that has already been determined for executing a job queued for execution by one of said plurality of processors, by comparing the load statuses of the processors stored in the operation status table, at regular intervals.

2. A method for changing a job execution processor according to claim 1, wherein said step for changing a job execution processor further comprises a step for transmitting a request for changing a job execution processor to a higher-loaded second processor when there has been no job to be executed by a job scheduler of a first processor, and transmitting a job from the second processor to the first processor in response to the request.

3. A method for changing a job execution processor according to claim 1, wherein said step for changing a job execution processor further comprises a step for changing a job execution processor in a second processor when a request for changing a job execution processor has been received from a first processor.

4. A method for changing a job execution processor according to claim 1, wherein said step for changing a job execution processor further comprises a step in which each processor checks job execution waiting numbers of all processors stored on each operation status table at regular intervals, and a step for changing a job execution processor of a job waiting for execution by a first processor to a second processor capable of executing the job when said first processor is highly loaded and when the second processor has no waiting job.

5. A method for changing a job execution processor according to claim 1, wherein said load to be monitored by said processor monitoring step is the number of jobs waiting for execution by said processors.

6. A method for changing a job execution processor according to claim 1, wherein said load to be monitored by said processor monitoring step is a CPU using rate by said processors.

7. A method for changing a job execution processor according to claim 1, wherein said load to be monitored by said processor monitoring step is an I/O unit using rate by said processors.

8. A method for changing a job execution processor according to claim 1, wherein said load to be monitored by said processor monitoring step is a memory using rate by said processors.

9. In a system including a plurality of processors for executing jobs, a job scheduler for controlling the sequence of executing said jobs, a communication control unit for carrying out data transmission between said plurality of processors, and job transfer means for carrying out transfer of jobs between said plurality of processors, a system for changing a job execution processor, comprising:

processor monitoring means for mutually monitoring a load status for each of said plurality of processors;

job execution processor determining means for determining a job execution processor by comparing the load statuses of all of said plurality of processors when a job is inputted to the system, wherein said step of comparing the load statuses of all of said plurality of processors is performed by referring to an operation status table that stores the load statuses of all of said plurality of processors; and job execution processor changing means for mutually changing a job execution processor that has already been determined for executing a job queued for execution by one of said plurality of processors, by comparing the load statuses of the processors stored in the operation status table, at regular intervals.

10. A system for changing a job execution processor according to claim 9, wherein said means for changing a job execution processor further comprises means for transmitting a request for changing a job execution processor to a higher-loaded second processor when there has been no job to be executed by a job scheduler of a first processor, and for transmitting a job from the second processor to the first processor in response to the request.

11. A system for changing a job execution processor according to claim 9, wherein said means for changing a job execution processor further comprises means for changing a job execution processor in a second processor when a request for changing a job execution processor has been received from a first processor.

12. A system for changing a job execution processor according to claim 9, wherein said means for changing a job execution processor further comprises means, in each processor, for checking job execution waiting numbers of all processors stored on each operation status table at regular intervals, and means for changing a job execution processor of a job waiting for execution by a first processor to a second processor when said first processor is highly loaded.

13. A system for changing a job execution processor according to claim 9, wherein said load to be monitored by said processor monitoring means is the number of jobs waiting for execution by said processors.

14. A system for changing a job execution processor according to claim 9, wherein said load to be monitored by said processor monitoring means is a CPU using rate by said processors.

15. A system for changing a job execution processor according to claim 9, wherein said load to be monitored by said processor monitoring means is an I/O unit using rate by said processors.

16. A system for changing a job execution processor according to claim 9, wherein said load to be monitored by said processor monitoring means is a memory using rate by said processors.

17. In a system including a plurality of processors for executing jobs, the plurality of processors being connected to one another, a method for changing a job execution processor, including the steps, executed by respective processors, of:

monitoring own processor load status, and monitoring a load status of each of the other processors by receiving load data from each of the other processors;

storing the load statuses of all of said plurality of processors in an operation status table, the operation status table being updated at regular intervals;

determining a job execution processor by comparing the load statuses of all of said plurality of processors when a job is inputted to the system, wherein said step of comparing the load statuses of all of said plurality of processors is performed by referring to said operation status table;

when there is no waiting job in own processor, sending a job transfer request to another of said plurality of processors having the heaviest load by referring to the operation status table, receiving a job transferred from the processor to which the job transfer request was sent, and executing the job; and when there are waiting jobs in said own processor, receiving a job transfer request from another of said plurality of processors, selecting one of the waiting jobs which can be executed by the job transfer requesting processor, and transferring the selected job to the processor from which the job transfer request was received.

18. A system including a plurality of processors for executing jobs, the processors being connected to one another, for distributing load over the processors, each processor including:

a communication control unit for sending/receiving data to/from other processors;

a processor monitoring unit for monitoring own processor load status and monitoring a load status of each of the other of said plurality of processors by receiving load data from the other of said plurality of processors via the communication control unit, and for storing the load statuses of all of said plurality of processors in an operation status table, the operation status table being updated at regular intervals;

a job execution processor determining unit for determining a job execution processor executing each waiting job by comparing the load statuses of all of said plurality of processors when a job is inputted to the system and when there are waiting jobs in own processor, wherein said step of comparing the load statuses of all of said plurality of processors is performed by referring to the operation status table; and a job execution processor changing unit for sending a job transfer request to a heaviest-loaded one of the other processors via the communication control unit when there is no waiting job in said own processor; and a job transfer control unit for transferring a job that is already awaiting execution by said heaviest-loaded one of the other processors to another processor via the communication control unit when receiving the job transfer request, the waiting job being determined to be executed by the job transfer requesting processor by the job execution processor changing unit, and for receiving the transferred job via the communication control unit.

19. A method for changing a job execution processor according to claim 1, wherein each of said plurality of processors has an operation status table that stores the load statuses of all of said plurality of processors, and wherein said step of comparing the load statuses of all of said plurality of processors is performed by referring to the operation status table contained in the processor performing the load status comparison.

20. A method for changing a job execution processor according to claim 19, wherein each of said plurality of processors further contains a job status table that stores all jobs being executed or queued for all of said plurality of processors, and executable processors for each job stored in said job status table.

21. A system for changing a job execution processor according to claim 9, wherein each of said plurality of processors has an operation status table that stores the load statuses of all of said plurality of processors, and wherein said job execution processor determining means compares the load status of all of said plurality of processors by referring to the operation status table contained in the processor performing the load status comparison.

22. A system for changing a job execution processor according to claim 21, wherein each of said plurality of processors further contains a job status table that stores all jobs being executed or queued for all of said plurality of processors, and executable processors for each job stored in said job status table.

23. A method for changing a job execution processor according to claim 17, wherein each of said plurality of processors has an operation status table that stores the load statuses of all of said plurality of processors, and wherein said step of comparing the load statuses of all of said plurality of processors is performed by referring to the operation status table contained in the processor performing the load status comparison.

24. A method for changing a job execution processor according to claim 23, wherein each of said plurality of processors further contains a job status table that stores all jobs being executed or waiting for all of said plurality of processors, and executable processors for each job stored in said job status table.

25. A system according to claim 18, wherein each of said plurality of processors has an operation status table that stores the load statuses of all of said plurality of processors, and wherein said job execution processor determining unit compares the load statuses of all of said plurality of processors by referring to the operation status table contained in the processor performing the load status comparison.

26. A system according to claim 25, wherein each of said plurality of processors further contains a job status table that stores all jobs being executed or waiting for all of said plurality of processors, and executable processors for each job stored in said job status table.

* * * * *